United States Patent [19]

Ramaciotti

[11] Patent Number: 4,778,215
[45] Date of Patent: Oct. 18, 1988

[54] FLEXIBLE ROOF FOR MOTOR VEHICLES

[75] Inventor: Lorenzo Ramaciotti, Turin, Italy

[73] Assignee: Pininfarina S.p.A., Turin, Italy

[21] Appl. No.: 25,743

[22] Filed: Mar. 13, 1987

[30] Foreign Application Priority Data

Mar. 18, 1986 [IT] Italy .............................. 67217 A/86

[51] Int. Cl.⁴ ............................ B60J 1/14; B60J 1/18; B60J 7/12
[52] U.S. Cl. ................................. 296/107; 296/121; 296/122; 296/201; 296/147
[58] Field of Search .............. 296/146, 201, 107, 147, 296/116, 117, 121, 122

[56] References Cited

U.S. PATENT DOCUMENTS

| | | | |
|---|---|---|---|
| 2,267,471 | 12/1941 | Keller | 296/117 |
| 2,768,857 | 10/1956 | Albrecht | 296/117 |
| 2,895,764 | 7/1959 | Himka et al. | 296/117 |
| 3,053,567 | 9/1962 | Geiger | 296/107 |
| 4,572,570 | 2/1986 | Trucco | 296/107 |
| 4,573,732 | 3/1986 | Muscat | 296/116 X |

FOREIGN PATENT DOCUMENTS

| | | |
|---|---|---|
| 0189649 | 11/1985 | European Pat. Off. . |
| 650980 | 8/1985 | Switzerland . |
| 21012539 | 1/1983 | United Kingdom . |
| 2141389 | 12/1984 | United Kingdom . |

*Primary Examiner*—Dennis H. Pedder
*Attorney, Agent, or Firm*—Reed Smith Shaw & McClay

[57] ABSTRACT

A flexible roof for motor vehicles with convertible tops includes a rigid glass rear window which moves from its normal position of use to a retracted position within the passenger compartment of the motor vehicle as a result of the movement of the roof. Flexible means are provided for connecting the roof to the rear window so as to keep the rear window in its raised position when the flexible roof is in its extended condition. The roof further includes a pair of rear side windows supported by a first arcuate element which forms part of the framework of the roof and which is articulated at its ends to the body of the motor vehicle about a transverse axis. The rear edge of the roof material is connected to a second arcuate element which is also articulated to the front edge of the rear window. This second arcuate element is also articulated at its ends to the motor vehicle body about a transverse axis whereby, when the first arcuate element is in its erect position, the second arcuate element can be raised to a position adjacent the first arcuate element so as to dispose the rear window in a substantially vertical position with its rear edge facing upwardly and its outer surface facing forwardly. In this manner, the roof can then be folded and the two arcuate elements can be brought backwards into a lowered position to dispose the rear window and the rear side windows in their retracted position within the passenger compartment.

7 Claims, 6 Drawing Sheets

FLEXIBLE ROOF FOR MOTOR VEHICLES

The present invention relates to a flexible roof for motor vehicles, which is movable between an extended condition roofing the passenger compartment of the motor vehicle and a folded non-covering condition, the flexible roof comprising:

a jointed framework for connection to the body of the motor vehicle, a piece of flexible roof material attached to the jointed framework and having a rear opening, a rigid glass rear window having means along its lower edge for its articulated connection to a support structure and movable, as a result of the movement of the roof, between a raised position in which it is in correspondence with the rear aperture, with its peripheral edge in sealing contact with the inner surface of the edge of this aperture, and a lowered position in which the rear window is housed within the body of the motor vehicle, flexible connection means connecting the rear window to the roof so that the rear window is kept in its raised position when the flexible roof is in its extended covering condition.

A flexible roof having the characteristics indicated above is described and illustrated in Italian Patent Application No. 53471-B/83 and in the corresponding U.K. Patent Application No. 2 141 389. This roof has the advantage of enabling the manoeuvre for moving the roof from its extended condition to its folded condition, and vice versa, to be carried out easily and effortlessly.

In order to obtain a series of further advantages in addition to the advantage mentioned above, the invention provides a roof of the type indicated at the beginning of the present description, characterised in that it further includes:

a pair of rear side windows supported by a first arcuate element which forms part of the framework of the roof and which is articulated at its ends to the body of the motor vehicle about a transverse axis, whereby the rear side windows are movable with the first arcuate element, as a result of the movement of the roof between its extended position and its folded position, between an erect position projecting above the passenger compartment and a retracted position within the body, respectively, a second arcuate element forming part of the framework of the roof, to which the rear edge of the roof material is connected and which also constitutes the support structure to which the lower edge of the rear window is articulated, the second arcuate element having its ends articulated about a transverse axis to the body of the motor vehicle whereby, when the first arcuate element is in its erect position, the second arcuate element can be raised to a position adjacent the first arcuate element so as to dispose the rear window in a substantially vertical position with its rear edge facing upwardly and its outer surface facing forwardly, after which the roof can be folded with the arcuate elements so as to dispose the rear window and the rear side windows in a retracted position within the passenger compartment.

According to a further characteristic, the two rear side windows are articulated at their upper ends to the first arcuate element whereby, in their erect positions, the windows are movable about the articulations between operative positions pivoted outwardly of the passenger compartment and inwardly-pivoted inoperative positions in which they allow the second arcuate element to be raised and the two end arms of this arcuate element to pass outside the windows. The first arcuate element has resilient means biasing the two rear side windows into their innermost positions and a lever connected to the two windows and kept by the second arcuate element, when the latter is in its lowered position, in a position in which it retains the side windows in their outermost positions against the action of the resilient means.

A further characteristic of the roof according to the invention lies in the fact that the articulations for the ends of the second arcuate element include cam means which cause the two ends of the element to move towards each other when it is raised. Thus, any interference between the end arms of the latter and the weather strips fixed to the body of the motor vehicle and intended to cooperate with the lower edges of the rear side windows is avoided during raising of the second arcuate element.

The roof according to the invention also has further resilient means biassing the first arcuate element into its raised position. These resilient means render negligible the force needed to be exerted by the user in moving the roof from its folded position to its extended position.

The roof also includes a cover for closing the passenger compartment space which houses the roof itself in its folded condition. This cover is articulated at its rear edge to the ends of two levers which are articulated in their turn to the body of the motor vehicle and which are shaped so that the movement of opening the cover includes a first withdrawal phase and a second rearward tipping phase. Thus, the space intended to receive the roofing material with its framework, the rear side windows, and the rear window is left completely free.

Further characteristics and advantages of the invention will become apparent from the description which follows with reference to the appended drawings, provided purely by way of non-limiting example, in which.

In the drawings, there is indicated 1 the body of a motor vehicle with a convertible top also referred to herein as sun roof, which is provided with a flexible roof 2 which can be moved between an extended condition roofing the passenger compartment of the vehicle (see FIGS. 1 and 4) and a folded condition (see FIGS. 2 and 5) in which it is housed in a space 3 (FIG. 5) formed in the passenger compartment of the motor vehicle.

Figure 4:
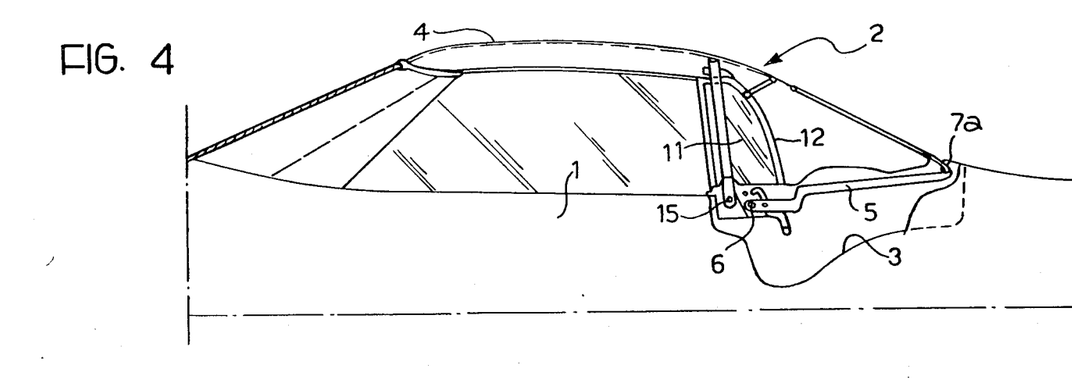
FIGS. 4, 5 and 6 are schematic side views illustrating the roof in the conditions corresponding to FIGS. 1, 2 and 3, respectively.

The roof 2 comprises a piece of flexible roofing material 4 associated with a jointed framework. This framework comprises an arcuate element 5 which is articulated at its ends (in a manner which will be explained in detail below) to the motor vehicle body about a transverse axis 6 (FIG. 4). The roofing material 4 has a rear aperture 7 (FIG. 1) intended for location in correspondence with the rear window and is connected at its rear edge to the arcuate element 5. The central part of this element also supports the lower edge of the frame 8 of a rigid glass rear window 9 by means of an articulated hinge 7a. The upper edge of the frame 8, however, is connected to the ends of a series of flexible belts 10 (one of which is visible in FIGS. 1 and 7) which run above a series of cross members forming part of the rigid framework of the roof and which are connected at their opposite ends to a front cross member (not visible in the drawings) to which the front edge of the roofing material is connected.

This arrangement, which is of known type (see Italian Patent Application No. 53471-B/83. enables the rear window 9 to be kept in its normal raised position of use, in contact with and sealed against the inner surface of the aperture 7, when the roof 2 is in its extended condition.

Figure 7:
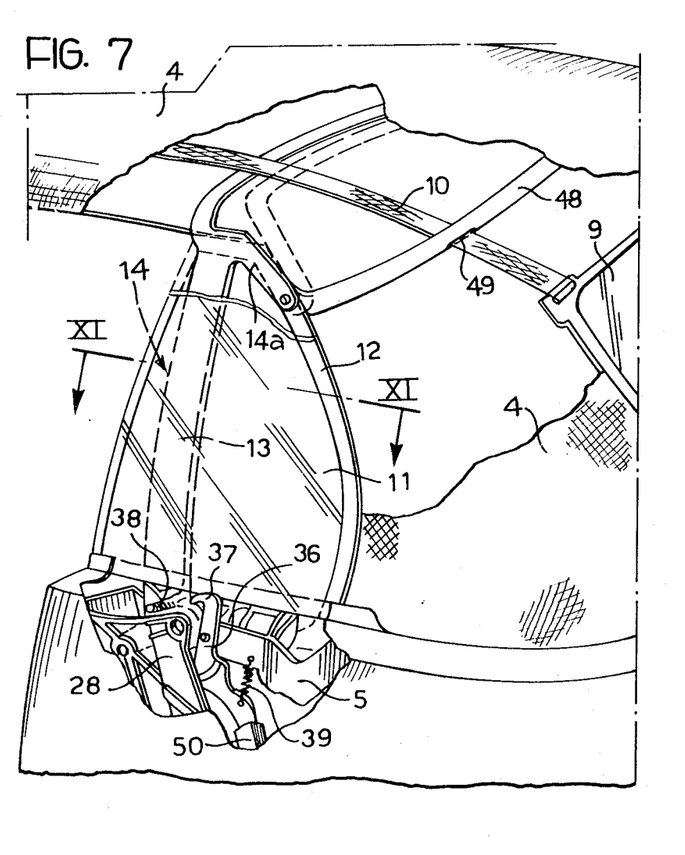
FIG. 7 is a partially sectioned view of a detail of FIG. 1.
Figure 9:
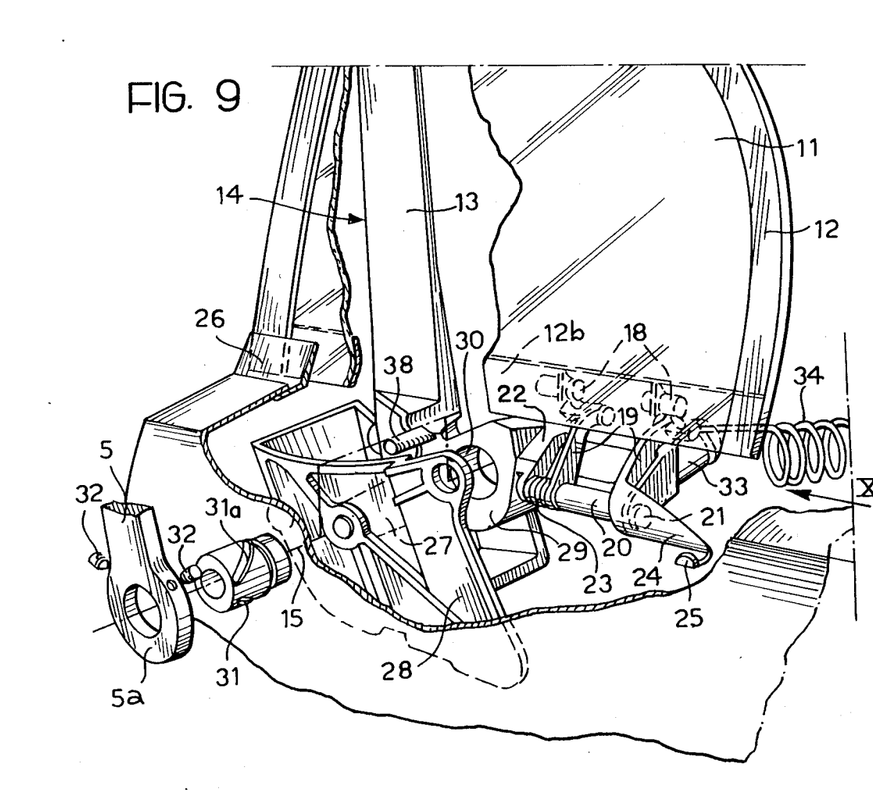
FIG. 9 is a view illustrating a detail of FIG. 7 on an enlarged scale and in a different operative condition.
Figure 10:
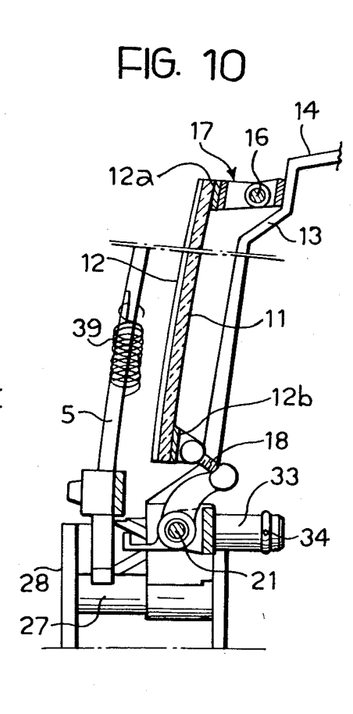
FIG. 10 is a view of a detail of FIG. 9 taken on the arrow X illustrated in that Figure.
Figure 11:
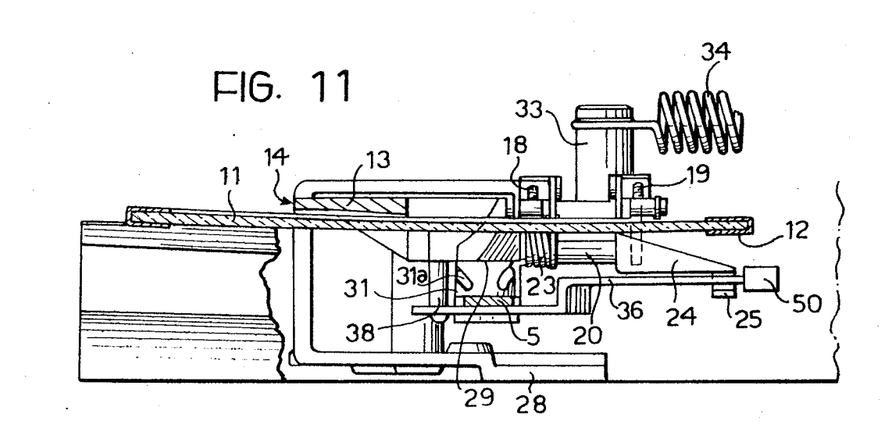
FIG. 11 is a sectional view taken on the line XI—XI of FIG. 7.

The roof also includes two rear side windows 11, only one of which is visible in the drawings, which are substantially triangular in shape and the frames 12 of which are supported by the end portions 13 of a further arcuate element 14 (FIG. 7). The ends of the arcuate element 14 are articulated to the motor vehicle body about a transverse axis 15 (FIG. 4). The upper edge 12a (FIG. 10) of the frame 12 of each rear side window 11 is articulated about a substantially longitudinal axis 16 to the respective portion 13 of the arcuate element 14 by a hinge 17. The lower edge 12b of the frame 12 of each window 11, however, is connected by two joints 18 (FIG. 9) to a pair of levers 19 carried by a shaft 20 rotatably supported about a substantially longitudinal axis 21 by a bracket 22 fixed to the respective end portion 13 of the arcuate element 14 and projecting from the lower end thereof. A spring 23 is also mounted on the shaft 20 with its ends connected respectively to the body of the bracket 22 and to one of the two levers 19 so as to bias the respective side window 11 into a position pivoted inwardly of the passenger compartment about the axis 16 (FIG. 10). The body constituted by the shaft 20 and the two levers 19 is also connected to an arm 24 having a projecting end 25 on which the respective end portion of the arcuate element 5 (only part of which is visible in FIG. 9) presses downwardly when it is in its lowered position corresponding to the extended condition of the roof. In this condition, the arm 25 is retained against the action of the spring 23 in a position in which it keeps the respective window 11 in a position pivoted outwardly of the passenger compartment relative to the axis 16. In this outermost position, the lower edge of the window 11 is in contact with the longitudinal weather strip 26 (FIGS. 3, 7 and 9) which projects from the outer edge of the motor vehicle body.

Figure 3:
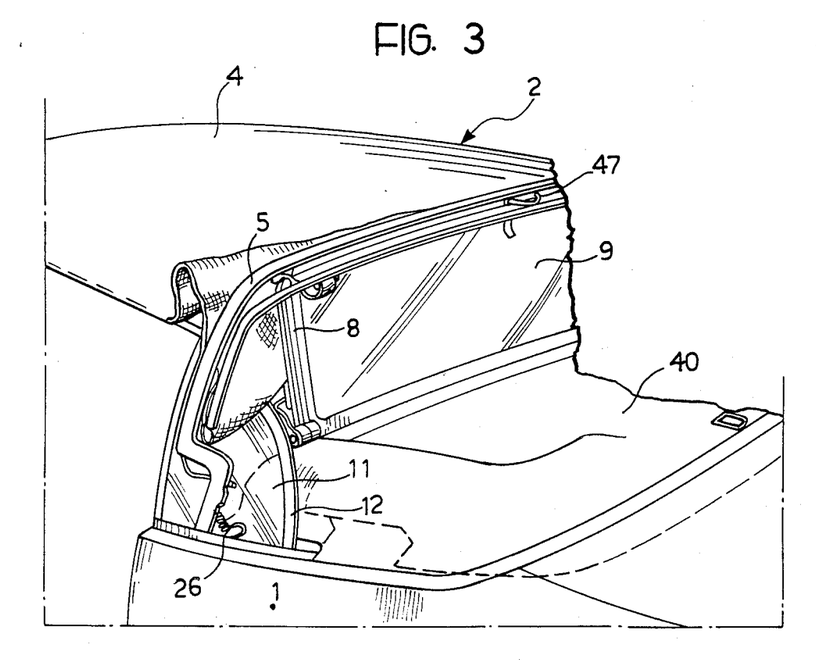
Figure 8:
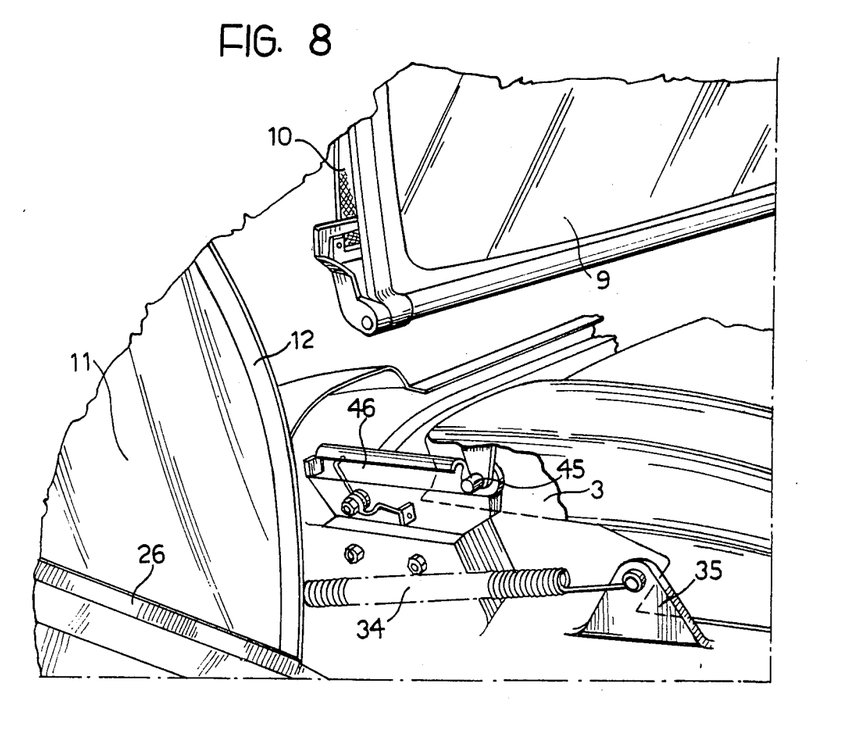
FIG. 8 is a view of a detail of FIG. 3 on an enlarged scale.

Each end of the arcuate element 14 is articulated to the motor vehicle body by the engagement of a cylindrical pin 27 fixed to its end in a seat (not visible in the drawings) formed in a support 28 fixed to the motor vehicle body. The bracket 22 projecting from each end of the arcuate element 14 also includes an enlarged portion 29 (FIG. 9) having a cylindrical cavity 30. Each end of the arcuate element 5 has a circular aperture 5a (FIG. 9) which is rotatable on an articulation pin 31 fixed so as to project from the portion 29 of the respective bracket 22 by the insertion of its end portion in the cylindrical cavity 30. The pin 31 also has a helical groove 31a which is engaged by two radial pins 32 fixed in radial holes formed in the edge of the aperture 5a and projecting into this aperture. The helical groove is shaped so that a raising of the arcuate element 5 from its lowered position corresponding to the extended condition of the roof to a raised condition in which it is adjacent the arcuate element 14 causes a simultaneous moving together of the ends of the arcuate element 5. This raising can therefore be carried out without interference between the end portions of the arcuate element 5 and the weather strips 26 cooperating with the lower edges of the rear side windows 11 (FIG. 3). At the same time, during the raising of the arcuate element 5, its end portions pass outside the two side windows 11 (FIG. 3) because the latter rotate towards their positions pivoted inwardly of the passenger compartment, under the action of the spring 23, as soon as the end portions of the arcuate element 5 are lifted out of engagement with the ends 25 of the arms 24. Moreover, the articulated connection of the ends of the arcuate element 14 to the body of the motor vehicle enables this arcuate element, and with it the two rear side windows 11, to move from an erect position (see FIGS. 3, 7 and 9) in which the rear side windows 11 project above the passenger compartment to a backwardly lowered condition (see FIG. 5) in which the two rear side windows are housed within the space 3 (as will be explained in more detail below). The bracket 22 associated with each end of the arcuate element 14 has an appendage 33 on its side facing inwardly of the passenger compartment, to which is fixed one end of a helical spring 34 the opposite end of which (see FIG. 8) is connected to a bracket 35 forming part of the motor vehicle body. The appendage 33 is in a lower position than the articulation axis 15 whereby the spring 34 associated with each end of the arcuate element 14 urges this element into its erect position.

When both the arcuate elements 5, 14 are in a raised position in which they are adjacent each other, the element 5 may be anchored to the element 14 by a ratchet gear 36 (FIG. 7) constituted by a rocker arm which is connected to the arcuate element 5 and has a hooked end 37 adapted to engage a pin 38 projecting from the arcuate element 14 and provided with a biassing spring 39 which is interposed between the rocker arm and the arcuate element 5 (FIG. 7).

Figure 2:
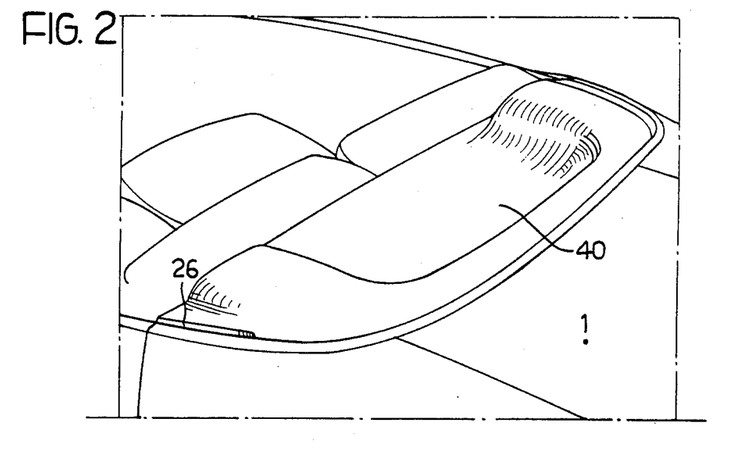
Figure 6:
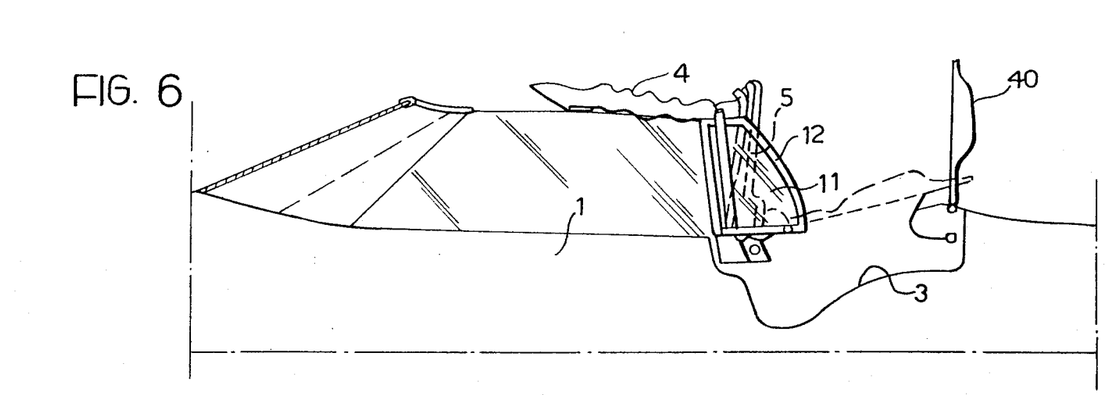

The space 3 formed within the passenger compartment of the motor vehicle has a rigid cover 40 which completely hides the roof from view when the latter is folded and housed within the space 3 (FIG. 2). The rigid cover 40 is articulated at its rear edge by two hinges 41 (only one of which is visible in FIG. 12) to the ends of two levers 42 the opposite ends of which are articulated about a transverse axis 43 to the motor vehicle body. By virtue of the presence of the levers 42, the cover 40 is connected to the body by a double articulation. Consequently, when the cover 40 is brought from its position closing the space 3 to its open position, it effects, in a first time interval, an upward and rearward movement (relative to the direction of movement of the motor vehicle) as a result of the rotation of the levers 42 about their articulations on the body, and, in a second time interval, tips rearwardly as a result of the rotation of the cover about its own articulations on the levers 42, so as to move into a vertical position (FIGS. 6 and 12) in which it leaves the opening of the space 3 completely free. Each hinge 41 is attached to a spring 44 which biasses the rigid cover 40 into its open condition. In the first phase of rearward movement of the cover, it is also guided by means of the engagement of two lateral pins 45 projecting from its front edge (FIG. 8) in two corresponding guide channels 46 fixed to the motor vehicle body.

Figure 12:
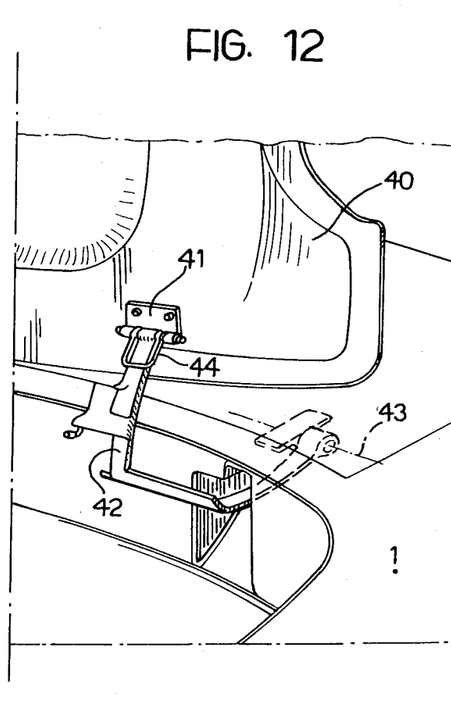
FIG. 12 is a perspective view of a further detail of the roof of the invention.

At the end of the first phase of rearward movement, the pins 45 pass over the rear ends of the guide channels 46 so that the cover 40 can be tipped into the position illustrated in FIG. 12.

When the roof is in its extended condition, the rigid cover 40 is in its closed condition and the roof is kept under tension in that the front edge of the roofing material is connected to the upper edge of the motor vehicle windscreen, while the arcuate element 5 to which the rear edge of the roofing material is connected is hooked to the anchoring device of known type (not illustrated) carried by the motor vehicle body and arranged to engage a hook 47 (FIG. 3) carried by the arcuate element 5 to retain it in a locked position in which the roofing material is under tension.

In the preceding description, those elements forming part of the jointed framework of the roof which are located in front of the arcuate element 14, as well as further elements of the framework disposed along the longitudinal side edges of the roofing material, have not been described in detail in that they do not fall within the scope of the present invention. The cross member indicated 48 in FIG. 7 is also part of the jointed framework of the roof and its ends are articulated about a transverse axis to appendages 14a projecting from the upper ends of the two side arms of the arcuate element 14. The strips 10 which are connected to the upper edge of the rear window 9 are also freely slidable within slots 49 formed in the cross member 48. The cross member of the arcuate element 14 and the further cross members of the jointed framework which are in front of it, however, are connected rigidly to the strips 10 by screws.

If it is assumed that the roof of the invention is in the extended condition illustrated in FIG. 1, the operations needed to bring it to the folded condition are as follows:

First of all, it is necessary to operate the locking device of the hook 47 (FIG. 3) in order to allow the arcuate element 5 to rise from its initial lowered position corresponding to the extended position of the roof. Once the hook 47 is released, the arcuate element 5 may be raised to its position illustrated in FIG. 3. This movement can occur, as already mentioned, without any interference with the weather strips 26 and the side windows 11 in that the latter are moved to their positions pivoted inwardly of the passenger compartment immediately the side arms of the arcuate element 5 leave the respective ends 25 of the arms 24 (FIG. 9), while the ends of the arcuate element 5 move closer to each other as a result of the engagement of the pins 32 in the helical groove 31a of the pin 31 (FIG. 9). During this phase, the arcuate element 14 remains in its erect position. The raising of the arcuate element 5 causes the raising of the lower edge of the rear window 9 which is articulated to it. Furthermore, the portions of the flexible strips 10 between the cross member of the arcuate element 14 and the upper edge of the rear window 9 move inwards, by virtue of the fact that the cross member 48 is also rotated about its articulations so as to be adjacent the cross member of the arcuate element 14. The upper edge of the rear window is thus free to move downwardly so that, with the arcuate element 5 in the raised condition, the rear window 9 is in a substantially vertical position with its lower edge facing upwardly and its outer surface facing forwardly (see FIG. 3). The user may anchor the arcuate element 5 in this position by engagement of the ratchet gear 36 on the pin 38 of the arcuate element 14. At this point, the user is free to move the rigid cover 40 of the space 3 into its open position illustrated in FIG. 6, with the above-described movement including the first phase of rearward movement and the second phase of rearward tipping. Once the cover 40 has been opened, the user can then unhook the front edge of the roof from the upper edge of the motor vehicle windscreen (FIG. 6) and fold the entire roof into the space 3.

Figure 5:
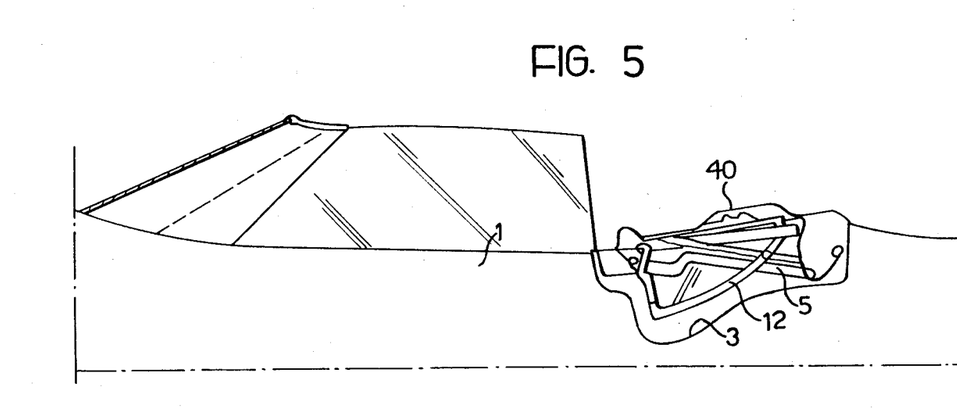

The rotation of the arcuate element 14 obviously causes simultaneous rotation of the side windows 11 which are thus housed within the space 3 (FIG. 5). At the same time, the movement of the arcuate elements 5, 14 brings the rear window 9 into a substantially horizontal position within the space 3. Once the roof 2 has been housed completely in the space 3 the latter may be closed by the return of the rigid cover 40 to its lowered condition.

Figure 1:
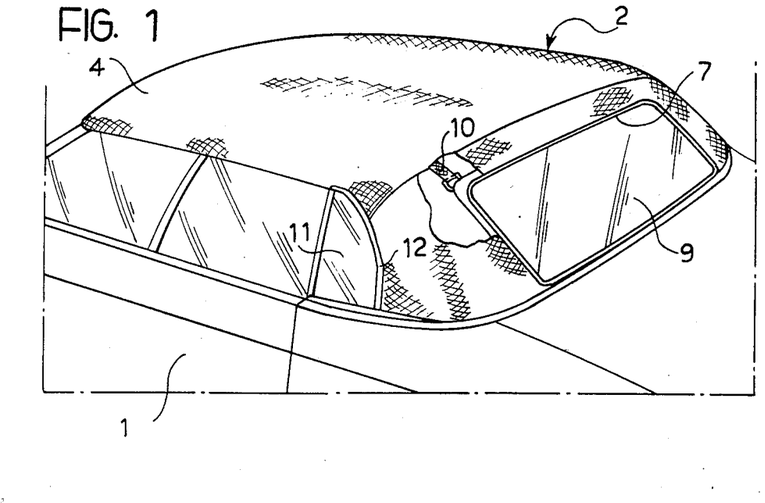
FIGS. 1, 2 and 3 are schematic partial perspective views of a motor vehicle provided with a roof according to the invention, in which the roof is illustrated in its extended condition, in its folded condition, and in an intermediate condition in the folding manoeuvre, respectively.

In order to return the roof to its extended position of FIG. 1, it is necessary to carry out the operations again in reverse order. The phase of raising the arcuate element 14 and the side windows 11 associated therewith is naturally facilitated by the action of the helical springs 34.

Naturally, the principle of the invention remaining the same, the constructional details and forms of embodiment may be varied widely with respect to that described and illustrated purely by way of example, without thereby departing from the scope of the present invention.

I claim:

1. Flexible roof for motor vehicles, which is movable between an extended condition roofing the passenger compartment of the motor vehicle and a folded non-covering condition, the flexible roof comprising:
    a jointed framework for connection to a body of the motor vehicle,
    a piece of flexible roofing material attached to the jointed framework and having a rear aperture,
    a rigid glass rear window having means along its lower edge for its articulated connection to said framework and movable, as a result of the movement of the cover, between a raised position in which it is in correspondence with the rear aperture, with its peripheral edge in sealing contact with the inner surface of the edge of this aperture, and a lowered position in which the rear window is housed within the body of the motor vehicle,
    flexible connection means connecting the rear window to the roof so that the rear window is kept in its raised position when the flexible roof is in its extended covering condition,
    a pair of rear side windows supported by a first arcuate element which forms part of the framework of the roof and which is articulated at its ends to the body of the motor vehicle about a transverse axis, whereby the rear side windows are movable together with the first arcuate element, as a result of the movement of the roof between its folded position and its extended position, between an erect position projecting above the passenger compartment and a retracted position with the body, respectively, a second arcuate element forming part of the framework of the roof, to which a rear edge of the roofing material is connected and which also constitutes support structure to which the lower edge of the rear window is articulated, said two rear side windows being articulated at their upper ends about a substantially longitudinal axis to the first arcuate element whereby, in their erect positions, the windows are movable about the articulations between operative positions, pivoted outwardly, and inwardly-pivoted inoperative positions in which they allow the second arcuate element to be raised and the ends of this arcuate element to pass outside the windows, and wherein the first arcuate element has resilient means biasing the two rear side windows into their inwardly pivoted positions and a lever connected to the two windows and kept by the second arcuate element, when the latter is in its lowered position, in a position in which it retains the side windows in their outwardly pivoted positions against the action of the resilient means, the second arcuate element having its ends articulated about a transverse axis to the body of the motor vehicle whereby, when the first arcuate element is in its erect position, the second arcuate element can be raised to a position adjacent the first arcuate element so as to dispose the rear window in a substantially vertical position with its lower edge facing upwardly and its outer surface facing forwardly, after which the roof can be folded with the arcuate elements so as to dispose the rear window and the rear side windows in a retracted position with the body.

2. Flexible roof for motor vehicles, which is movable between an extended condition roofing the passenger compartment of the motor vehicle and a folded non-covering condition, the flexible roof comprising:

a jointed framework for connection to a body of the motor vehicle, a piece of flexible roofing material attached to the jointed framework and having a rear aperture, a rigid glass rear window having means along its lower edge for its articulated connection to said framework and movable, as a result of the movement of the cover, between a raised position in which it is in correspondence with the rear aperture, with its peripheral edge in sealing contact with the inner surface of the edge of this aperture, and a lowered position in which the rear window is housed within the body of the motor vehicle, flexible connection means connecting the rear window to the roof so that the rear window is kept in its raised position when the flexible roof is in its extended covering condition, a pair of rear side windows supported by a first arcuate element which forms part of the framework of the roof and which is articulated at its ends to the body of the motor vehicle about a transverse axis, whereby the rear side windows are movable together with the first arcuate element, as a result of the movement of the roof between its folded position and its extended position, between an erect position projecting above the passenger compartment and a retracted position with the body, respectively, a second arcuate element forming part of the framework of the roof, to which the rear edge of the roofing material is connected and which also constitutes support structure to which the lower edge of the rear window is articulated, the second arcuate element having its ends articulated about a transverse axis to the body of the motor vehicle whereby, when the first arcuate element is in its erect position, the second arcuate element can be raised to a position adjacent the first arcuate element so as to dispose the rear window in a substantially vertical position with its lower edge facing upwardly and its outer surface facing forwardly, after which the roof can be folded with the arcuate elements so as to dispose the rear window and the rear side windows in a retracted position with the body, and said articulations for the ends of the second arcuate element including cam means which cause the ends of the arcuate element to move towards each other when it is raised.

3. Flexible roof for motor vehicles, which is movable between an extended condition roofing the passenger compartment of the motor vehicle and a folded non-covering condition, the flexible roof comprising:

a jointed framework for connection to a body of the motor vehicle, a piece of flexible roofing material attached to the jointed framework and having a rear aperture, a rigid glass rear window having means along its lower edge for its articulated connection to said framework and movable, as a result of the movement of the cover, between a raised position in which it is in correspondence with the rear aperture, with its peripheral edge in sealing contact with the inner surface of the edge of this aperture, and a lowered position in which the rear window is housed within the body of the motor vehicle, flexible connection means connecting the rear window to the roof so that the rear window is kept in its raised position when the flexible roof is in its extended covering condition, a pair of rear side windows supported by a first arcuate element which forms part of the framework of the roof and which is articulated at its ends to the body of the motor vehicle about a transverse axis, whereby the rear side windows are movable together with the first arcuate element, as a result of the movement of the roof between its folded position and its extended position, between an erect position projecting above the passenger compartment and a retracted position with the body, respectively, a second arcuate element forming part of the framework of the roof, to which a rear edge of the roofing material is connected and which also constitutes support structure to which the lower edge of the rear window is articulated, the second arcuate element having its ends articulated about a transverse axis to the body of the motor vehicle whereby, when the first arcuate element is in its erect position, the second arcuate element can be raised to a position adjacent the first arcuate element so as to dispose the rear window in a substantially vertical position with its lower edge facing upwardly and its outer surface facing forwardly, after which the roof can be folded with the arcuate elements so as to dispose the rear window and the rear side windows in a retracted position with the body, and a rigid cover being provided for closing the space of the passenger compartment which houses the folded roof, the rigid cover having its rear edge articulated to the ends of two levers which are articulated in their turn to the body of the motor vehicle so that the opening movement of the rigid cover includes a first phase of withdrawal and raising due to the rotation of the levers about their articulations on the body, and a second phase of rearward tipping due to the rotation of the cover about its articulations on the levers.

4. Roof according to claim 2, wherein each end of the second arcuate element is mounted on an articulation pin having a helical groove and is provided with at least one radial pin which engages the helical groove.

5. Roof according to claim 1, wherein the lever is rotatably mounted on a bracket fixed to the first arcuate element and having one end in contact with the second arcuate element and its opposite end connected to the respective side window, the resilient means being constituted by a spring interposed between the lever and the bracket.

6. Roof according to claim 1, wherein resilient means are provided for biassing the first arcuate element into its erect position.

7. Roof according to claim 1, wherein the second arcuate element has a biased latch for anchoring it to the first arcuate element in the raised position.

* * * * *